(12) United States Patent
Cho

(10) Patent No.: US 8,493,266 B2
(45) Date of Patent: *Jul. 23, 2013

(54) GLOBAL POSITIONING SYSTEM (GPS) RECEIVER AND METHOD OF DETERMINING LOCATION OF GPS RECEIVER

(75) Inventor: JaeBum Cho, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/441,947

(22) Filed: Apr. 9, 2012

(65) Prior Publication Data
US 2012/0206294 A1    Aug. 16, 2012

Related U.S. Application Data

(63) Continuation of application No. 12/623,623, filed on Nov. 23, 2009, now Pat. No. 8,154,448.

(30) Foreign Application Priority Data

Dec. 15, 2008    (KR) ........................ 10-2008-0127436

(51) Int. Cl.
*G01S 19/42*    (2010.01)
(52) U.S. Cl.
USPC .................................................... 342/357.25

(58) Field of Classification Search
USPC ..................................................... 342/357.25
See application file for complete search history.

(56) References Cited

U.S. PATENT DOCUMENTS

2001/0034210 A1    10/2001    Nir et al.
2003/0058161 A1     3/2003    Ring

FOREIGN PATENT DOCUMENTS

| JP | 06034740 | 2/1994 |
|----|----------|--------|
| JP | 2007218853 | 8/2007 |
| JP | 2008089612 | 4/2008 |
| KR | 1020050068971 A | 7/2005 |

*Primary Examiner* — Harry Liu
(74) *Attorney, Agent, or Firm* — Volentine & Whitt, PLLC

(57) ABSTRACT

A Global Positioning System (GPS) receiver includes a GPS receiving unit configured to receive navigation data from at least one visible satellite, a decoder configured to decode the received navigation data to extract time and almanac information from the decoded navigation data and a database configured to store satellite disposition information. A satellite location determining unit is configured to select at least one visible satellite candidate using the time information and the satellite disposition information, and to determine locations-in-space of the at least one visible satellite candidate with the almanac information. Also, a navigation filter is configured to calculate pseudo-ranges from the at least one visible satellite and the selected at least one visible satellite candidate using the corresponding locations-in-space, and to determine a location of the GPS receiver using the calculated pseudo-ranges.

25 Claims, 6 Drawing Sheets

Fig. 5

| SLOT | RAAN | Argument of Latitude |
|---|---|---|
| A1 | 272.847° | 268.126° |
| A2 | 272.847° | 161.786° |
| A3 | 272.847° | 11.676° |
| A4 | 272.847° | 41.806° |
| B1 | 332.847° | 80.956° |
| B2 | 332.847° | 173.336° |
| B3 | 332.847° | 309.976° |
| B4 | 332.847° | 204.376° |
| C1 | 32.847° | 111.876° |
| C2 | 32.847° | 11.796° |
| C3 | 32.847° | 339.666° |
| C4 | 32.847° | 241.556° |

| SLOT | RAAN | Argument of Latitude |
|---|---|---|
| D1 | 92.847° | 135.226° |
| D2 | 92.847° | 265.446° |
| D3 | 92.847° | 35.156° |
| D4 | 92.847° | 167.356° |
| E1 | 152.847° | 197.046° |
| E2 | 152.847° | 302.596° |
| E3 | 152.847° | 66.066° |
| E4 | 152.847° | 333.686° |
| F1 | 212.847° | 238.886° |
| F2 | 212.847° | 345.226° |
| F3 | 212.847° | 105.206° |
| F4 | 212.847° | 135.346° |

EPOCH: 0000Z, 1, July 1993
GREENWICH HOUR ANGLE: $18^h\ 36^m\ 14.4^s$
REFERENCED TO FK5/J2000.00 COORDINATEES

GLOBAL POSITIONING SYSTEM (GPS) RECEIVER AND METHOD OF DETERMINING LOCATION OF GPS RECEIVER

CROSS-REFERENCE TO RELATED APPLICATIONS

This is a Continuation of application Ser. No. 12/623,623, filed Nov. 23, 2009, which issued as U.S. patent No. 8,154,448 on Apr. 10, 2012, and which makes a claim of priority to Korean Patent Application No. 10-2008-0127436, filed on Dec. 15, 2008, in the Korean Intellectual Property Office, the subject matter of which is hereby incorporated by reference.

BACKGROUND

The present inventive concept relates to a global positioning system (GPS). More particularly, the present inventive concept relates to a GPS receiver and positioning method implemented by the GPS receiver.

Generally, GPS was developed to measure locations of objects, typically in latitude, longitude and/or altitude. For example, GPS services enable a user to determine his or her location by receiving GPS signals from a constellation of GPS satellites, measuring information for the current location, and providing the measured information to the user.

In addition, GPS services are utilized for navigation purposes using additional data, such as map information, traffic information, and the like. For example, when a user selects a destination, navigation information, such as traffic or direction information from the current location to the selected destination, is provided to the user using previously stored map information. Further, GPS services have been applied to various fields, such as military maneuvers, aeronautical operations, air traffic control, and the like. In addition to location information, it is possible to acquire time references from GPS satellites.

GPS services require orbiting GPS satellites for broadcasting GPS signals, and a GPS receiver for calculating location information in response to the received GPS signals. Currently, GPS services depend on a GPS constellation, which includes twenty-four GPS satellites orbiting Earth in different orbits (in particular, twenty-seven GPS satellites orbit the Earth, three of which are supplemental satellites). In order to determine its location, the GPS receiver must acquire GPS signals from at least four of the GPS satellites. That is, the GPS receiver must lock onto signals from four or more GPS satellites.

However, when there is jamming or interference due to other radio waves or physical obstructions, such as buildings, forests, and the like, the GPS receiver may not be able to lock onto four or more GPS satellites. In this case, the GPS receiver is unable to accurately determine its location using GPS services.

SUMMARY

Exemplary embodiments are directed to a GPS receiver and positioning methods implemented by the GPS receiver, capable of determining the location of the GPS receiver when usable signals are received from fewer than four GPS satellites.

One aspect of the exemplary embodiments provides a Global Positioning System (GPS) receiver that includes a GPS receiving unit configured to receive navigation data from at least one visible satellite, a decoder configured to decode the received navigation data to extract time and almanac information from the decoded navigation data, and a database configured to store satellite disposition information. The GPS receiver further includes a satellite location determining unit configured to select at least one visible satellite candidate using the time information and the satellite disposition information, and to determine locations-in-space of the at least one visible satellite candidate with the almanac information, and a navigation filter configured to calculate pseudo-ranges from the at least one visible satellite and the selected at least one visible satellite candidate using the corresponding locations-in-space, and to determine a location of the GPS receiver using the calculated pseudo-ranges.

Another aspect of the exemplary embodiments provides a method of determining a location of a GPS receiver. The method includes receiving navigation data from at least one visible satellite; decoding the received navigation data to extract time and almanac information from the decoded navigation data; selecting at least one visible satellite candidate using the time information and satellite disposition information stored in the GPS receiver; determining a location-in-space of the selected at least one visible satellite candidate using the almanac information; calculating pseudo-ranges from the at least one visible satellite and the selected at least one visible satellite candidate using the locations-in-space of the at least one visible satellite and the selected at least one visible satellite candidate; and determining a location of the GPS receiver using the calculated pseudo-ranges.

BRIEF DESCRIPTION OF THE FIGURES

Illustrative embodiments of the inventive concept will be described in further detail with reference to the attached drawings, wherein like reference numerals refer to like parts throughout the various figures unless otherwise specified.

FIG. 5 is a table showing right ascension of the ascending node and argument of each satellite.

DETAILED DESCRIPTION OF THE EMBODIMENTS

Figure 1:
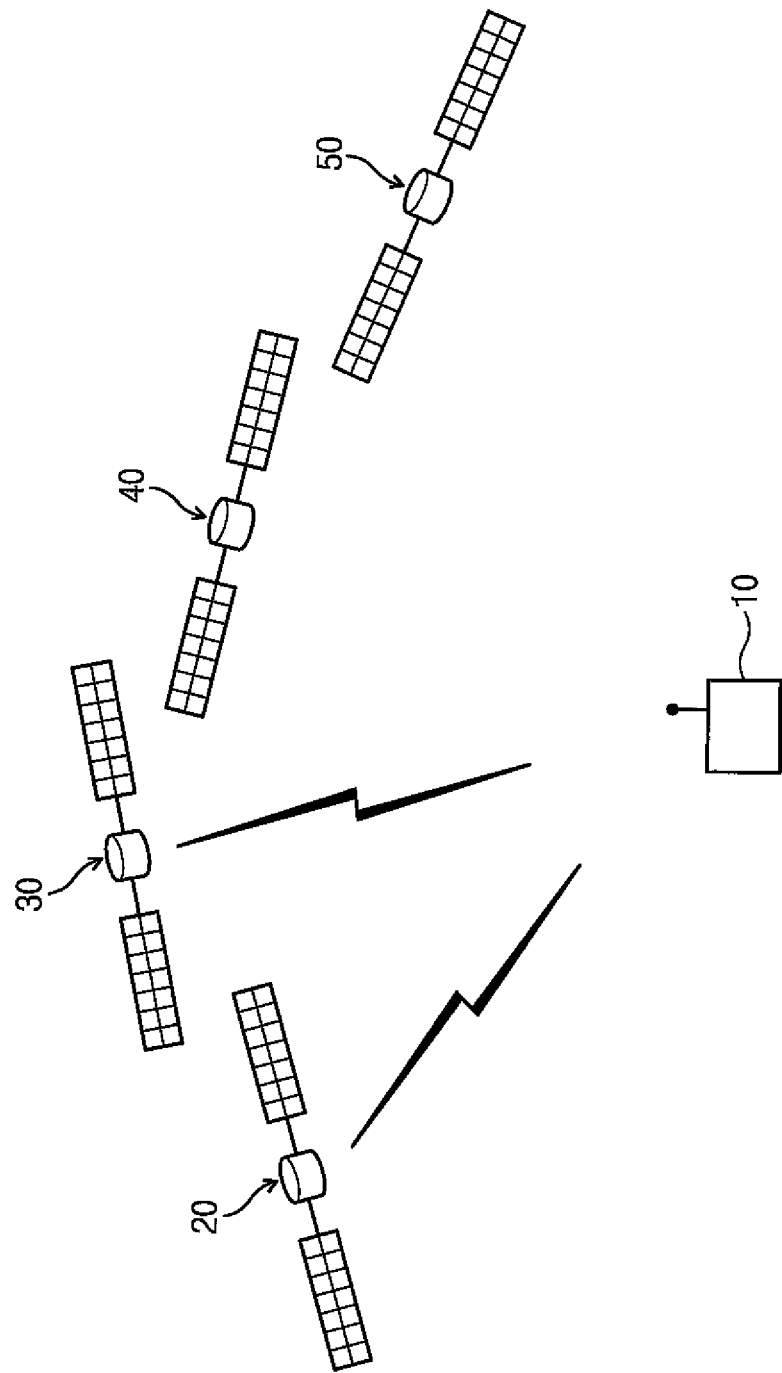
FIG. 1 is a block diagram showing a Global Positioning System (GPS) location determination system, according to an embodiment.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments. Throughout the drawings and written description, like reference numerals will be used to refer to like or similar elements.

According to various embodiments, a GPS receiver is able to determine its own location by receiving and processing information received from at least one visible satellite, and by additionally selecting one or more visible satellite candidates based on the information from the at least one visible satellite, when the number of visible satellites is less than four. A visible satellite candidate is a satellite that is part of the constellation of satellites, but is not presently visible to the GPS receiver (e.g., the GPS receiver is unable to lock onto or receive signals from the satellite).

The GPS receiver is configured to select one or more visible satellite candidates using previously stored satellite disposition information and time information, e.g., received from the visible satellite(s), and to determine locations-in-space of the selected visible satellite candidates using almanac information received from the visible satellite(s).

The GPS receiver according to various embodiments may include any type of terminal having a GPS module and/or service functionality, such as a personal digital assistant (PDA), a smart phone, a portable media player (PMP), a navigator, and the like. The embodiments described below assume that the GPS receiver is able to lock onto or receive GPS signals from at least one visible GPS satellite.

FIG. 1 is a block diagram showing a GPS location determination system, according to an exemplary embodiment of the inventive concept.

Referring to FIG. 1, The GPS location determination system includes a GPS receiver 10 and multiple GPS satellites 20, 30, 40, and 50. The GPS satellites 20 to 50 broadcast GPS signals from their respective orbits (about 20,000 km from Earth's surface), and the GPS receiver 10 calculates location information for a user based on incoming GPS signals from the GPS satellites 20 to 50. In FIG. 1, four GPS satellites 20 to 50 are illustrated for purposes of illustration, although the complete constellation includes twenty-four GPS satellites rotating Earth in respective orbits.

Conventionally, the GPS receiver 10 would require four or more visible satellites to determine its current location. However, it is assumed that the GPS receiver 10 in FIG. 1 is able to receive GPS signals from only two visible satellites, GPS satellites 20 and 30, and is not able to receive GPS signals from the remaining satellites, GPS satellites 40 and 50. Although the GPS receiver 10 is not able to lock onto four or more visible satellites, it is still able to determine its location using only the GPS signals received from the GPS satellites 20 and 30, according to the various embodiments.

In an embodiment, the GPS receiver 10 locks onto at least one visible satellite (e.g., GPS satellite 20 and 30). A GPS signal broadcast from the visible satellite may include, for example, navigation data. In addition to the visible satellites, the GPS receiver 10 also selects at least one visible satellite candidate (e.g., GPS satellite 40 and 50) so that the location of the GPS receiver 10 can be determined. Each of the visible satellite candidates is a GPS satellite among the multiple GPS satellites in the constellation having GPS signals that are not received by the GPS receiver 10. In this manner, although the GPS receive 10 has locked onto less than four visible satellites, the GPS receiver 10 still able to calculate pseudo-ranges between the GPS receiver 10 and GPS satellites using locations-in-space of four or more GPS satellites by selecting the visible satellite candidates. The GPS receiver 10 is able to use geometric trigonometry (e.g., trilateration) for positioning calculations.

Figure 2:
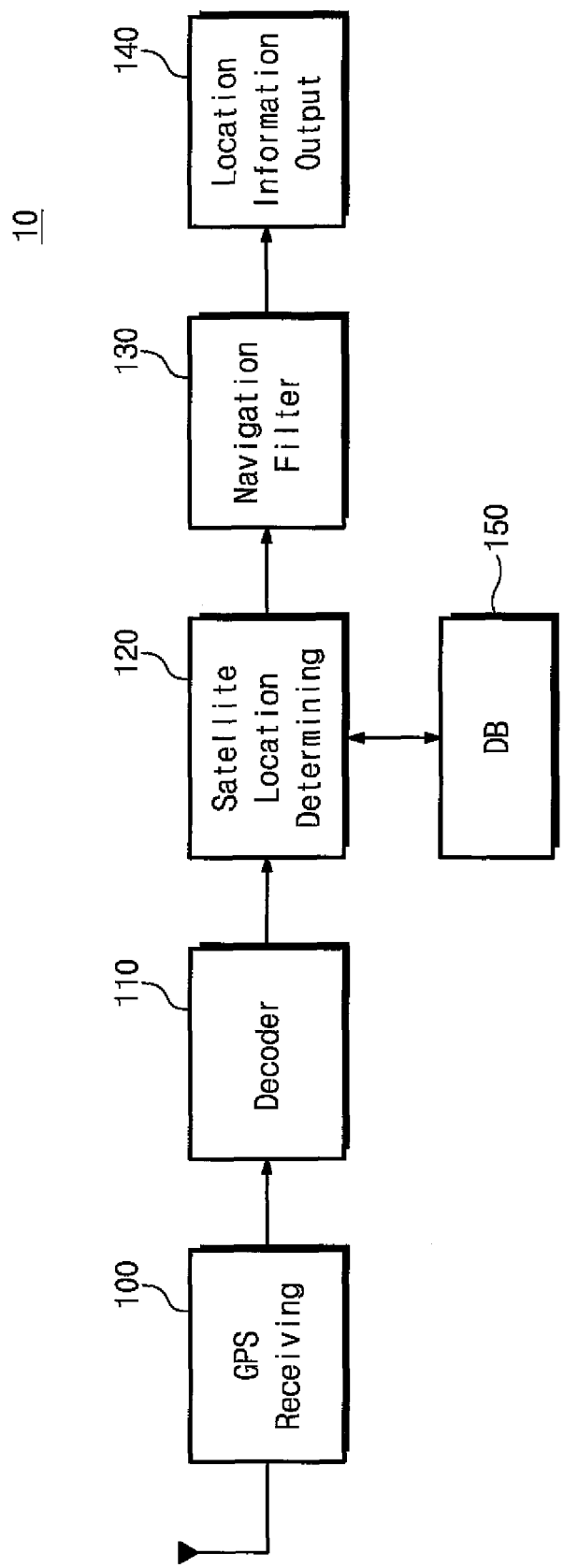
FIG. 2 is a block diagram showing a GPS receiver, according to an embodiment.

FIG. 2 is a block diagram showing a GPS receiver, according to an exemplary embodiment of the inventive concept.

Referring to FIG. 2, the GPS receiver 10 includes a GPS receiving unit 100, a decoder 110, a satellite location determining unit 120, a navigation filter 130, a location information output unit 140, and database 150.

The GPS receiving unit 100 is configured to receive and demodulate a GPS signal from GPS satellites through an antenna. For example, the GPS receiving unit 100 may receive a GPS signal from a visible satellite, the received GPS signal including a navigation message or navigation data. The navigation data provides orbit information for determining a location-in-space of the GPS satellite, as described below with reference to FIG. 3.

The GPS receiving unit 100 outputs the demodulated GPS signal to the decoder 110, which decodes the incoming GPS signal. That is, the decoder 110 is configured to decode the navigation data of the GPS signal and provides the decoded result to the satellite location determining unit 120. The decoder 110, for example, decodes the navigation data of the GPS signal to extract time information, almanac information, ephemeris information, etc. The decoder 110 provides the extracted information to the satellite location determining unit 120.

The time information may include at least one of satellite clock correction terms and a GPS week number. The satellite clock correction terms are used for satellite clock correction and the GPS week number refers to a number counted in weekly units. The almanac information is orbit information of the satellites and includes information for calculating locations-in-space of all GPS satellites. The almanac information includes a set of parameters for each GPS satellite that can be used to calculate its approximate location in orbit.

The database 150 stores the satellite disposition information, which is constellation information regarding the dispositions of the GPS satellites in their respective orbits, and may be used to determine location-in-spaces of the GPS satellites. The satellite disposition information is more fully described with reference to FIG. 4.

The satellite location determining unit 120 determines a location-in-space of a visible satellite using the decoded navigation data received from the visible satellite. As stated above, the decoded navigation data may include, for example, time information, almanac information, ephemeris information, etc.

The satellite location determining unit 120 is also able to determine a location-in-space of a visible satellite candidate using the decoded navigation data. In an embodiment, the satellite location determining unit 120 first selects a visible satellite candidate (e.g., using an identifier of the visible satellite candidate) based on corresponding satellite disposition information stored in the database 150 and time information. The satellite location determining unit 120 may select a visible satellite candidate, which is to be used to determine the location of the GPS receiver 10, among the GPS satellites other than the visible satellite(s). Then, the satellite location determining unit 120 may determine the location-in-space of the selected visible satellite candidate using the almanac information.

The satellite location determining unit 120 may select the visible satellite candidate(s) such that the total number of visible satellites and visible satellite candidates is at least four. The satellite location determining unit 120 enables the location of the GPS receiver 10 to be determined by additionally selecting visible satellite candidates when the number of visible satellites is less than four. The satellite location determining unit 120 provides location information of the visible satellite candidate(s) to the navigation filter 130.

The navigation filter 130 calculates a pseudo-range from each visible satellite candidate based on information for determining the location-in-space of the visible satellite candidate. The navigation filter 130 also calculates a pseudo-range from each visible satellite based on the information for determining the location-in-space of the visible satellite. The navigation filter 130 is then able to determine the location of the GPS receiver 10 based on the calculated pseudo-ranges (that is, pseudo-ranges from the visible satellite candidates and the visible satellites). The navigation filter 130 may include a Kalman filter, for example, which is a recursive filter applicable to a liner system and is used for real-time processing of data associated with the satellites.

The navigation filter 130 may determine not only the location of the GPS receiver 10, but also the speed of the GPS receiver 10, when the GPS receiver 10 is actively mobile. The navigation filter 130 provides the determined location and/or speed information of the GPS receiver 10 to the location information output unit 140.

In an embodiment, the location information output unit 140 includes a display unit, an audio unit, and the like, for example. The location information output unit 140 is configured to convert the determined location/speed information of the GPS receiver 10 into properly formatted data (e.g., image or audio formatting, respectively), so that the location information may be displayed and/or announced.

The GPS receiver 10 may include a controller (not shown). The controller is configured to control the operations described above, enabling the GPS receiver 10 to determine its geographic location and/or speed.

When four visible satellites are locked onto, the GPS receiver 10 may determine its location using a conventional location determining process. However, when four visible satellites are not locked onto, the GPS receiver 10 must determine its location using the location determining process according to embodiments of the inventive concept.

Figure 3:
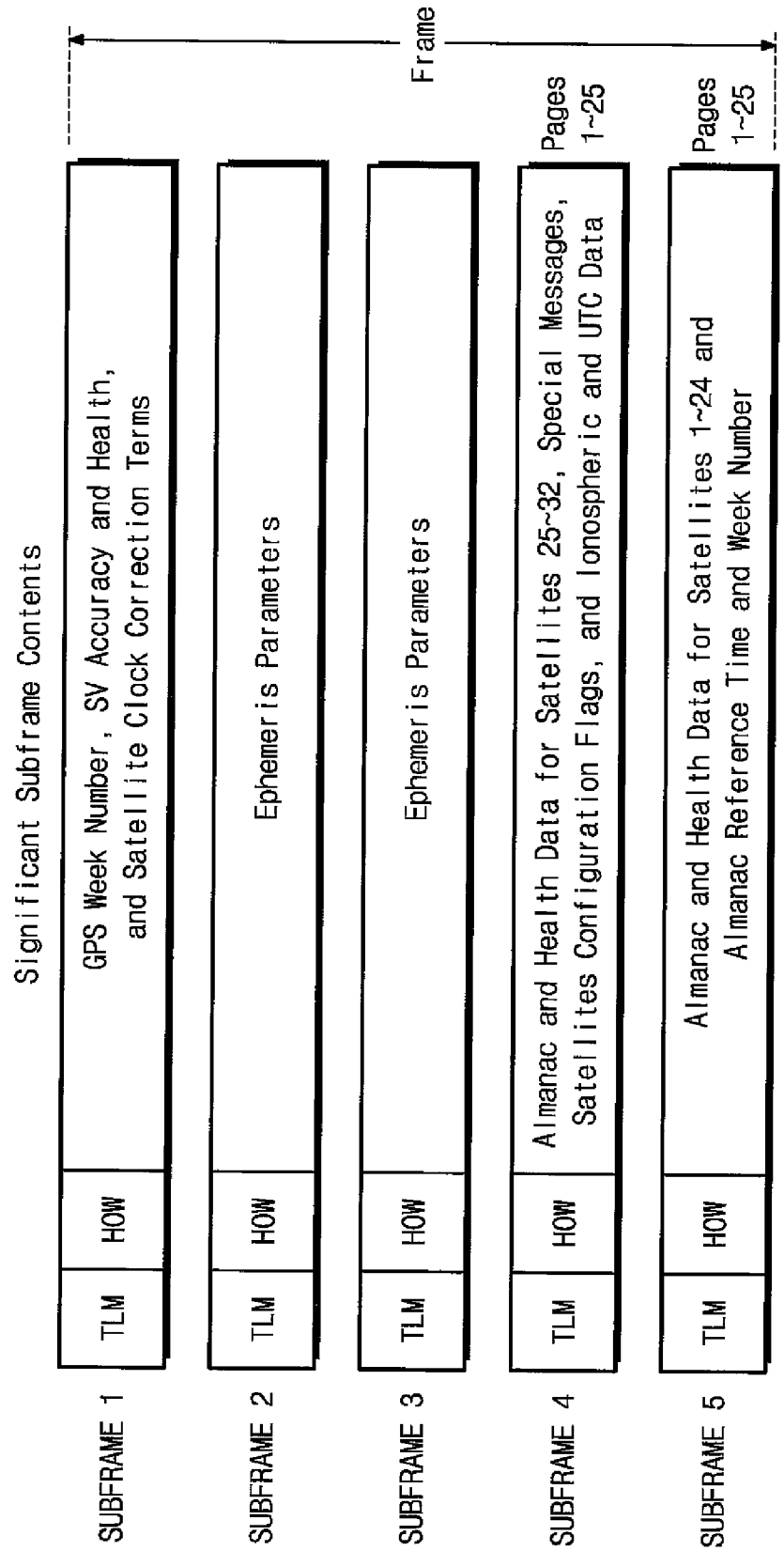
FIG. 3 is a diagram showing navigation data, according to an embodiment.

FIG. 3 is a diagram showing navigation data, according to an exemplary embodiment of the inventive concept.

Referring to FIG. 3, navigation data may be navigation messages, which include a series of frame (e.g., indicated by representative Frame in FIG. 3). Each Frame may include five subframes, Subframe 1 through Subframe 5. For example, the Frame in the depicted embodiment consists of 1,500 bits and has a period of 30 seconds. Each of the Subframes 1 through 5 consists of 300 bits and has a period is 6 seconds.

The Subframes 1 through 5 include the following information. The first subframe, Subframe 1, includes a GPS week number, space vehicle (SV) accuracy and health, and satellite clock correction terms. The second subframe, Subframe 2, and the third subframe, Subframe 3, include ephemeris parameters, respectively. The ephemeris parameters provide the orbital information of the satellite's orbit, which is recorded over time. The ephemeris may be used to predict subsequent orbit and/or shifts in orbit of the corresponding satellite. The ephemeris parameters are recorded every 30 seconds, for example, and consist of 16 keplerian elements. Thus, the ephemeris parameters are not used after a certain time elapses.

The fourth subframe, Subframe 4, includes almanac and health data for satellites 25 to 32, special messages, satellite configuration flags, and Ionospheric and Coordinated Universal Time (UTC) data. The fifth subframe, Subframe 5, includes almanac and health data for satellites 1 to 24 and almanac reference time and week number. Each of Subframes 4 and 5 consists of 25 pages, which is the amount of data used to acquire accurate almanac data. The almanac data includes general information for all satellites.

The first to fifth subframes, Subframes 1 through 5, include telemetry (TLM) as information for frame acquisition and hand-over word (HOW) as a handover flag for inter-satellite handover, respectively. It is possible to determine the orbital position of one or more visible satellites using time data in Subframe 1 and almanac data in Subframes 4 and 5.

Figure 4:
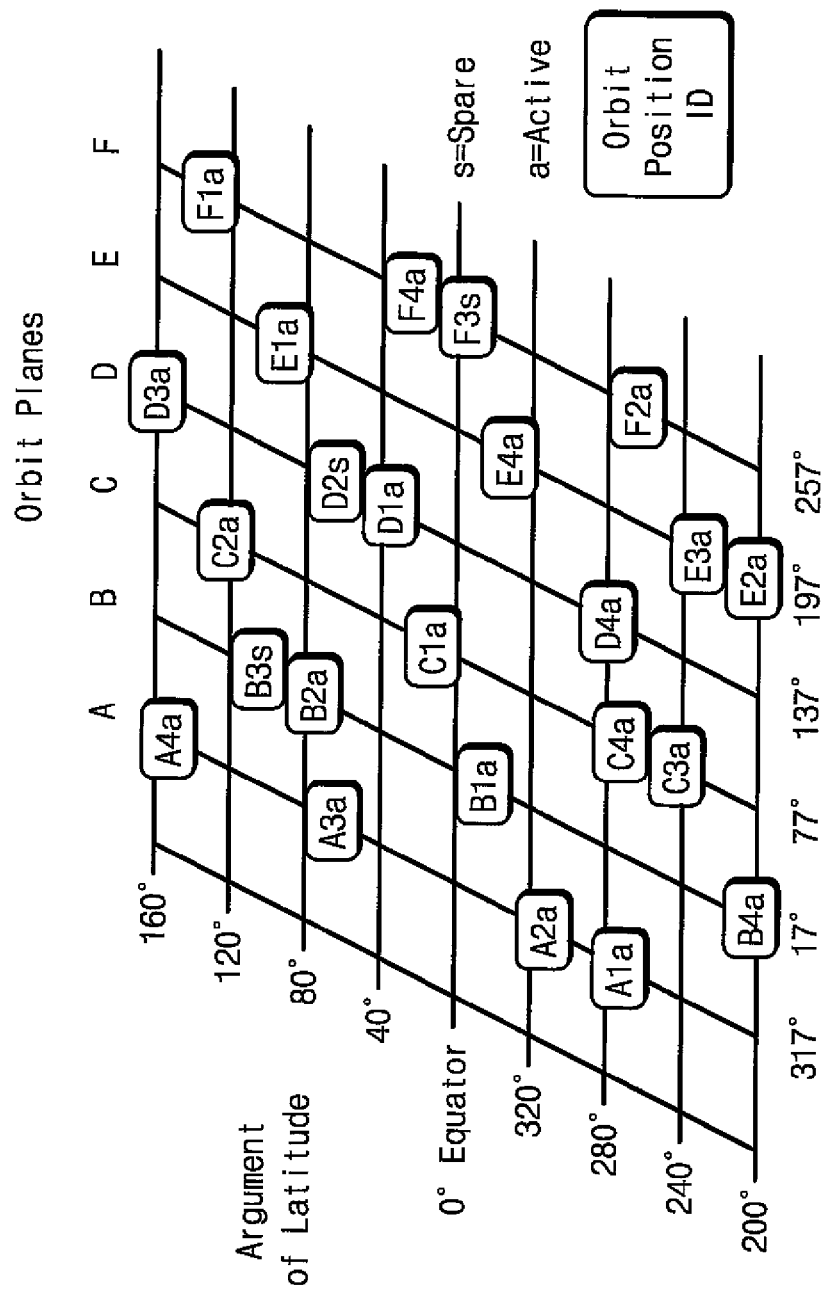
FIG. 4 is a diagram showing satellite disposition information, according to an embodiment.

FIG. 4 is a diagram showing satellite disposition information, according to an exemplary embodiment of the inventive concept, and FIG. 5 is a table showing the right ascension of the ascending node (RAAN) and argument of each satellite.

Referring to FIG. 4, satellite disposition information is the orbital position information for each of the GPS satellites in the GPS satellite constellation, including locations-in-space of the respective GPS satellites. The satellite disposition information is location-in-space information for each GPS satellite determined on the basis of RAAN and latitude parameters.

In FIG. 4, the generally vertical axis indicates the argument of latitude relative to the equator, and the horizontal axis indicates six orbit planes A to F. Each orbit plane includes four GPS satellites, and the six orbit planes include twenty-four GPS satellites. The horizontal axis may be used to illustrate the RAAN of each satellite, as illustrated in FIG. 5.

In FIG. 5, a slot indicates an identifier (or index) of each satellite, and symbols A to F included in a satellite identifier of each satellite indicates a corresponding orbit plane in which the satellite is located. FIG. 5 illustrates the RAAN and argument of latitude of each GPS satellite.

Accordingly, the satellite disposition information may be constellation information for satellite disposition in FIG. 4 or the RAAN and argument of latitude of a corresponding GPS satellite, as illustrated in FIG. 5. The satellite disposition information may include location-in-space information for all or part of the GPS satellites.

Figure 6:
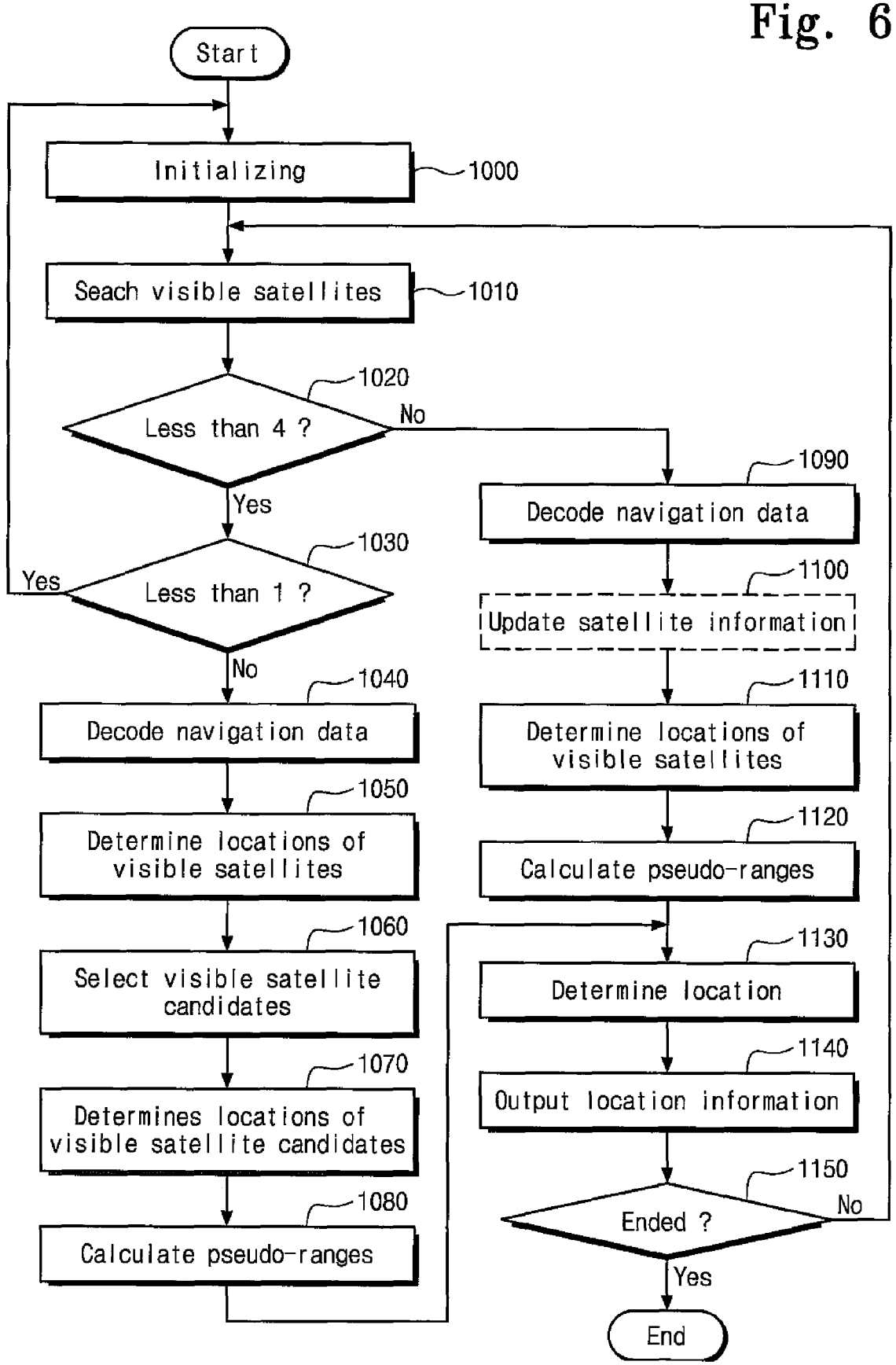
FIG. 6 is a flow diagram showing operation of a GPS receiver, according to an embodiment.

FIG. 6 is a flowchart showing operation of a GPS receiver, according to an exemplary embodiment of the inventive concept.

Referring to FIG. 6, a GPS receiver (e.g., GPS receiver 10 in FIG. 1) performs an initializing operation in block 1000. In block 1010, the GPS receiver searches visible satellites. For example, the GPS receiver may search GPS signals received from GPS satellites (e.g., GPS satellites 20 and 30 in FIG. 1), which may be the visible satellites with respect to the GPS receiver.

In block 1020, the GPS receiver determines whether the number of visible satellites located pursuant to the search is less than four. When the number of visible satellites is less than four, the GPS receiver performs a location determining process in accordance with embodiments of the present inventive concept, proceeding to block 1030.

In block 1030, the GPS receiver determines whether the number of visible satellites is less than one (i.e., there are no visible satellites). When the number of visible satellites less than one, the process returns to block 1000, since the GPS receiver must be able to lock onto signals from at least one visible satellite in order to determine its location.

When the number of visible satellites is not less than one, the GPS receiver decodes navigation data in the signals received from the visible satellites in block 1040. The decoded navigation data may include frame information, as illustrated in FIG. 3, for example.

In block 1050, the GPS receiver determines the locations-in-space of the visible satellites based on the navigation data. Since each visible satellite is a GPS satellite having GPS signals received by the GPS receiver, it is possible to directly determine the location-in-space of the visible satellite using the navigation data received from the GPS satellite.

In block 1060, the GPS receiver selects visible satellite candidates using time data extracted from the navigation data and satellite disposition information stored in the GPS receiver. More particularly, the GPS receiver selects identifiers of the visible satellite candidates.

In block 1070, the GPS receiver determines the locations-in-space of the selected visible satellite candidates. For example, the GPS receiver may determine the locations-in-space of the selected visible satellite candidates using almanac data, which is extracted by decoding the navigation data received from the visible satellites. The total number of visible satellites and visible satellite candidates may be four or more.

In block 1080, the GPS receiver calculates a pseudo-range of each of the visible satellites and visible satellite candidates when the locations-in-space of the visible satellites and visible satellite candidates have been determined. The GPS receiver may calculate the pseudo-range using the locations-in-space of the visible satellites and the visible satellite candidates, respectively.

Returning to block 1020, when the number of visible satellites is more than four, the GPS receiver is able to perform a conventional location determining process, proceeding to block 1090.

In block 1090, the GPS receiver decodes the navigation data from the visible satellites. In block 1100, the GPS receiver updates satellite disposition information, stored in a database, with information extracted from the decoded navigation data. In various embodiments, the updating of block 1100 may be performed selectively by the GPS receiver.

The GPS receiver determines the locations-in-space of the visible satellites using the navigation data in block 1110. In block 1120, since the visible satellites are GPS satellites having GPS signals received by the GPS receiver, the locations-in-space of the respective visible satellites may be determined directly using the navigation data received from the GPS satellites.

The GPS receiver calculates pseudo-ranges from the respective visible satellites in block 1120. For example, the GPS receiver may calculate the pseudo-ranges using locations-in-space of the visible satellites.

In block 1130, the GPS receiver determines its own location and/or speed using the calculated pseudo-ranges, using either the pseudo-ranges from the visible satellites and visible satellite candidates calculated in block 1080 or the pseudo-ranges from only the visible satellites calculated in block 1120. The GPS receiver then outputs the location information in block 1140. In an embodiment, outputting the location information in block 1140 is optional.

In block 1150, the GPS receiver determines whether to terminate the location determining. When the location determining operation is not to be terminated, the process returns to block 1010. When the location determining operation is to be terminated, the process ends.

In accordance with embodiments of the location determining operation of a GPS receiver, it is possible to determine the location of the GPS receiver, even though the GPS receiver has not locked onto at least four visible satellites, by selecting and calculating locations-in-space for visible satellite candidates. Accordingly, performance does not suffer when the number of visible GPS satellites is otherwise not enough for location determination.

While the present inventive concept has been described with reference to exemplary embodiments, it will be apparent to those skilled in the art that various changes and modifications may be made without departing from the spirit and scope of the present teachings. Therefore, it should be understood that the above embodiments are not limiting, but illustrative.

What is claimed is:

1. A location determination receiver, comprising:
   a receiving unit configured to receive navigation data from at least one visible satellite;
   a decoder configured to decode the received navigation data to extract time and almanac information;
   a database configured to store satellite disposition information;
   a satellite location determining unit configured to select at least one visible satellite candidate using the time information and the satellite disposition information, and to determine locations-in-space of the selected at least one visible satellite candidate using the almanac information; and
   a navigation filter configured to calculate pseudo-ranges from the at least one visible satellite and the selected at least one visible satellite candidate using the locations-in-space of the at least one visible satellite and the selected at least one visible satellite candidate, without the receiving unit receiving signals from the at least one visible satellite candidate, and to determine a geographic location of the receiver using the calculated pseudo-ranges.

2. The location determination receiver of claim 1, wherein the time information comprises at least one of satellite clock correction terms and a week number.

3. The location determination receiver of claim 1, wherein the satellite disposition information comprises satellite constellation information including locations-in-space of all satellites in the satellite constellation.

4. The location determination receiver of claim 1, wherein the total number of the at least one visible satellite and the at least one visible satellite candidate is at least four.

5. The location determination receiver of claim 1, wherein the satellite location determining unit is further configured to determine a location-in-space of the at least one visible satellite using the decoded navigation data.

6. The location determination receiver of claim 1, wherein the the at least one visible satellite is less than four visible satellites.

7. A method of determining a location of a receiver, the method comprising:
   receiving navigation data from at least one visible satellite of a plurality of satellites;
   decoding the received navigation data to extract time and almanac information;
   selecting at least one visible satellite candidate of the plurality of satellites using the time information and satellite disposition information stored in the receiver;
   determining a location-in-space of the selected at least one visible satellite candidate using the almanac information from the received navigation data;
   calculating pseudo-ranges from the at least one visible satellite and the selected at least one visible satellite candidate using the locations-in-space of the at least one visible satellite and the selected at least one visible satellite candidate without the received signals from the at least one visible satellite candidate; and
   determining a geographic location of the receiver using the calculated pseudo-ranges.

8. The method of claim 7, wherein the time information includes at least one of satellite clock correction terms and a week number.

9. The method of claim 7, wherein the satellite disposition information comprises satellite constellation information including locations-in-space of all satellites in the satellite constellation.

10. The method of claim 7, wherein the total number of the at least one visible satellite and the selected at least one visible satellite candidate is four or more.

11. The method of claim 7, further comprising determining a location-in-space of the at least one visible satellite using the decoded navigation data.

12. The method of claim 7, wherein the at least one visible satellite is less than four visible satellites.

13. A circuit for processing navigation data received from at least one visible satellite, comprising:
   a decoder configured to decode the navigation data, and to extract time and almanac information;
   a database configured to store satellite disposition information;
   a satellite location determining unit configured to select at least one visible satellite candidate using the time information and the satellite disposition information, and to determine locations-inn space of the selected at least one visible satellite candidate using the almanac information; and
   a navigation filter configured to calculate pseudo-ranges from the at least one visible satellite and the selected at least one visible satellite candidate using the locations-in-space of the at least one visible satellite and the selected at least one visible satellite candidate, without the received signals from the at least one visible satellite candidate, and to determine a geographic location using the calculated pseudo-ranges.

14. The circuit of claim 13, wherein the at least one visible satellite is less than four visible satellites.

15. The circuit of claim 13, wherein the total number of the visible satellite and the at least one visible satellite candidate is at least four.

16. The circuit of claim 13, wherein the time information comprises at least one of satellite clock correction terms and a week number.

17. The circuit of claim 13, wherein the satellite disposition information comprises satellite constellation information including locations-in-space of all satellites in the satellite constellation.

18. The circuit of claim 13, wherein the satellite location determining unit is further configured to determine a location-in-space of the at least one visible satellite using the decoded navigation data.

19. A location determination circuit, comprising:
   a satellite location determining unit configured to select at least one visible satellite candidate using stored satellite disposition information and time information extracted from navigation data of at least one visible satellite, without the received navigation data from the at least one visible satellite candidate, and to determine locations-inn space of the selected at least one visible satellite candidate using the almanac information extracted from the navigation data; and
   a navigation filter configured to calculate pseudo-ranges from the at least one visible satellite and the selected at least one visible satellite candidate using the locations-in-space of the visible satellite and the selected at least one visible satellite candidate, without the received signals from the at least one visible satellite candidate, and to determine a geographic location using the calculated pseudo-ranges.

20. The location determination circuit of claim 19, comprising:
   a database configured to store the satellite disposition information.

21. The location determination circuit of claim 19, wherein the at least one visible satellite is less than four visible satellites.

22. The location determination circuit of claim 19, wherein the total number of the at least one visible satellite and the at least one visible satellite candidate is at least four.

23. The location determination circuit of claim 19, wherein the time information comprises at least one of satellite clock correction terms and a week number.

24. The location determination circuit of claim 19, wherein the satellite disposition information comprises satellite constellation information including locations-in-space of all satellites in the satellite constellation.

25. A method of determining a location of a receiver, the method comprising:
   receiving navigation data from at least one but less than four visible satellites;
   selecting at least one visible satellite candidate using the received navigation data; and
   determining a geographic location of the receiver using the at least one visible satellite and the selected visible satellite candidate, wherein determining the geographic location includes calculate pseudo-ranges from the at least one visible satellite and the selected at least one visible satellite candidate using locations-in-space of the visible satellite and the selected at least one visible satellite candidate, and using the calculated pseudo-ranges to determine the geographic location.

* * * * *